United States Patent [19]

Barnes et al.

[11] 4,348,155
[45] Sep. 7, 1982

[54] WIND TURBINE BLADE PITCH CONTROL SYSTEM

[75] Inventors: Philip E. Barnes, West Hartford; Millard G. Mayo, Wethersfield; Robert Sherman, West Hartford, all of Conn.

[73] Assignee: United Technologies Corporation, Hartford, Conn.

[21] Appl. No.: 130,658

[22] Filed: Mar. 17, 1980

[51] Int. Cl.³ .............................................. F03D 7/02
[52] U.S. Cl. ....................................... 416/46; 416/48; 416/158
[58] Field of Search .................... 416/157 R, 158, 156, 416/48, 49, 46; 91/420

[56] References Cited

U.S. PATENT DOCUMENTS

| | | | |
|---|---|---|---|
| 2,355,039 | 8/1944 | Eves | 416/157 X |
| 2,597,419 | 5/1952 | Westbury et al. | 416/157 X |
| 3,256,780 | 6/1966 | Riley et al. | 416/114 X |
| 4,065,010 | 12/1977 | Worback | 91/420 X |
| 4,161,658 | 7/1979 | Patrick | 416/48 X |
| 4,201,514 | 5/1980 | Huetter | 416/37 |
| 4,274,808 | 6/1981 | Garner et al. | 416/114 |

FOREIGN PATENT DOCUMENTS 605561 7/1948 United Kingdom ................ 416/158

*Primary Examiner*—Everette A. Powell, Jr.
*Attorney, Agent, or Firm*—John Swiatocha

[57] ABSTRACT

A pitch control system for a multibladed variable pitch wind turbine. Each of the turbine blades is pivotally driven about the longitudinal axis thereof independently of the other blades by at least a pair of hydraulic actuators. The actuators are supplied with pressurized hydraulic fluid from a first source thereof under conditions of normal pitch change adjustment. Under conditions wherein feathering of the blades is required, the actuators are supplied with hydraulic fluid from second sources thereof such that one of the actuators associated with each of the blades is supplied with fluid from one second source and a second actuator is provided with fluid from a redundant second source whereby blade feathering may be effected despite a malfunction of one of the redundant sources or one of the actuators. In one of the two preferred embodiments disclosed, the first and second fluid sources are maintained in mutual communication whereby fluid from the second sources thereof may supplement fluid from the first source under conditions of normal blade pitch adjustment.

19 Claims, 2 Drawing Figures

WIND TURBINE BLADE PITCH CONTROL SYSTEM

This application is being filed on even date with U. S. patent application Ser. No. 130,657, for "Wind Turbine Blade Pitch Control System" in the name of Merritt B. Andrews; U. S. patent application Ser. No. 130,659, for "Wind Turbine Blade Pitch Adjustment System" in the names of Joseph P. Harry and Edward H. Kusiak; and U. S. application Ser. No. 130,656, for "Blade Pitch Actuation System" in the name of Merritt B. Andrews, all assigned to the assignee of the present invention.

TECHNICAL FIELD

This invention relates to wind turbines and particularly to a system for selectively adjusting the pitch of variable pitch wind turbine blades.

BACKGROUND ART

For enhanced performance, wind turbines are sometimes provided with variable pitch blades. The pitch of such blades is adjusted by selective pivoting of the blades about their longitudinal axes, thereby enabling the wind turbine to perform at optimum efficiency in varying wind conditions, as well as aiding start-up of the wind turbine, and preventing overspeed operation of the wind turbine in high wind velocities by feathering the blades.

Various mechanisms and control systems have been proposed for varying the pitch of wind turbine blades. One such system is disclosed in U.S. Pat. No. 4,083,651 to Cheney et al. and assigned to the assignee of the present invention. This system employs pendulum members centrifugally responsive to the rotor speed of the wind turbine to twist the wind turbine blades, thereby effecting selected blade pitch throughout the operating range of the wind turbine. It will be appreciated that the blade pitch adjustment range of such a system is limited by the centrifugal response of the pendulums and is automatic, responsive only to the operating parameters of the system and therefore incapable of being overridden when desired.

To provide for the continuous control of wind turbine blade pitch, it is desirable to implement hydraulic control systems wherein hydraulic fluid is selectively supplied to and drained from hydraulic actuators operatively connected to variable pitch wind turbine blades. Hydraulic control systems operating on such a general principle, have been employed in pitch control systems for aircraft propellers, examples of such hydraulic propeller blade control systems being found in U.S. Pat. Nos. 2,611,440, 2,809,702, 3,004,608 and 3,163,233. It will be observed that the systems disclosed in these patents, generally employ a single hydraulic motor which pivots the propeller blades in unison about the longitudinal axes thereof through a single mechanical movement in normal pitch change and emergency feathering modes of operation. In such systems, hydraulic fluid from a primary pump is supplied to the motor for normal pitch change adjustment. A backup or secondary pump supplies pressurized hydraulic fluid to the motor for feathering or in the event of breakdown of the primary pump. For a number of reasons, such propeller control systems are not entirely suitable for use with the variable pitch wind turbines. By way of example, in a variable pitch wind turbine, it is generally desirable to provide the turbine with independently movable blades, a capability which is not achieved by any of the aforementioned prior art patents without duplication of the entire hydraulic system and mechanical movement disclosed therein. Such duplication would of course be economically prohibitive and detract significantly from the efficiency of the turbine by adding significant weight to the turbine hub. Furthermore, it is desirable to provide redundancy in that portion of the pitch control system which controls emergency blade feathering, thereby minimizing the risk of damage to the turbine due to a malfunction of one of the feather control portions of the system. Such redundancy in the feather control system portion is clearly unattainable with the systems disclosed in the aforementioned patents without further duplication of those systems. Moreover such redundant feather control portions of the system should be capable of being hydraulically isolated from one another so that a malfunction of one feather control system due to, for example, depressurization from leakage, will not adversely affect the other or backup feather control system. The propeller blade pitch control systems of the aforementioned patents are inappropriate for and unadaptable to such independent and redundant feather control.

Other aircraft propeller control systems are disclosed in U.S. Pat. Nos. 2,505,206, 2,556,700 and 2,507,671. These systems, like those discussed hereinabove, generally provide pitch change adjustment and feathering of a plurality of aircraft propeller blades in unison. Unlike the systems of the aforementioned patents, the systems of these prior art patents employ accumulators or passive hydraulic fluid sources as a backup for a primary pump for blade feathering. However, it will be appreciated that utilization of an accumulator does not in any way cure the unadaptability of these systems to wind turbine blade pitch and feather control wherein independent pitch movement of each blade and hydraulically isolated fluid sources for feathering are required.

DISCLOSURE OF THE INVENTION

It is therefore a principal object of the present invention to provide a wind turbine blade pitch control system which overcomes the deficiencies of prior art wind turbine and propeller blade pitch control systems.

It is another object of the present invention to provide a wind turbine blade pitch control system wherein each of the wind turbine blades is independently actuated in pitch adjustment and feathering modes of operation.

It is another object of the present invention to provide a wind turbine blade pitch control system having independent redundant feather control means.

It is another object of the present invention to provide a wind turbine blade pitch control system which is economically feasible and detracts minimally from the performance of the wind turbine.

The wind turbine blade pitch control system of the present invention comprises a plurality of hydraulic actuators operably connected to each wind turbine blade for pivotally driving the blade about the longitudinal axis thereof. In the preferred embodiment, at least two such actuators power each blade so that failure of one actuator or the hydraulic system supplying fluid thereto is compensated by the second actuator. The system further includes a first and redundant second sources of hydraulic fluid supplied to the actuators for normal blade pitch adjustment and feathering of the blades as where the turbine is to be shut down or where overspeed protection in high wind velocity conditions is required. Hydraulic fluid from both first and second sources is valved to the blade actuators by means of distribution valves, the valve elements of which are mechanically linked to the blades themselves and nulled by the pivoting of the blades. The system employs a first control means which controls the supply of hydraulic fluid from the first source thereof to the distribution valves and a second control means which controls the supply of hydraulic fluid from the redundant second sources to the distribution valves such that fluid from any of the second redundant sources is supplied to at least one actuator associated with each of the turbine blades entirely independently of the other redundant sources or actuators associated with each blade. Thus, should one of the blade actuators or second sources fail, the remaining working actuator effects feathering of the blade without risk of depressurization due to the malfunction of the failed actuator or source. The control system also includes servo operated feather latches which mechanically latch the blades in feathered position and a servo operated teeter lock which locks the plane of the turbine blade tips in an angular orientation offset from vertical for minimizing the risk of impact of the blades with any supporting structure for the turbine in high wind velocity conditions.

BEST MODE FOR CARRYING OUT THE INVENTION

Figure 1:
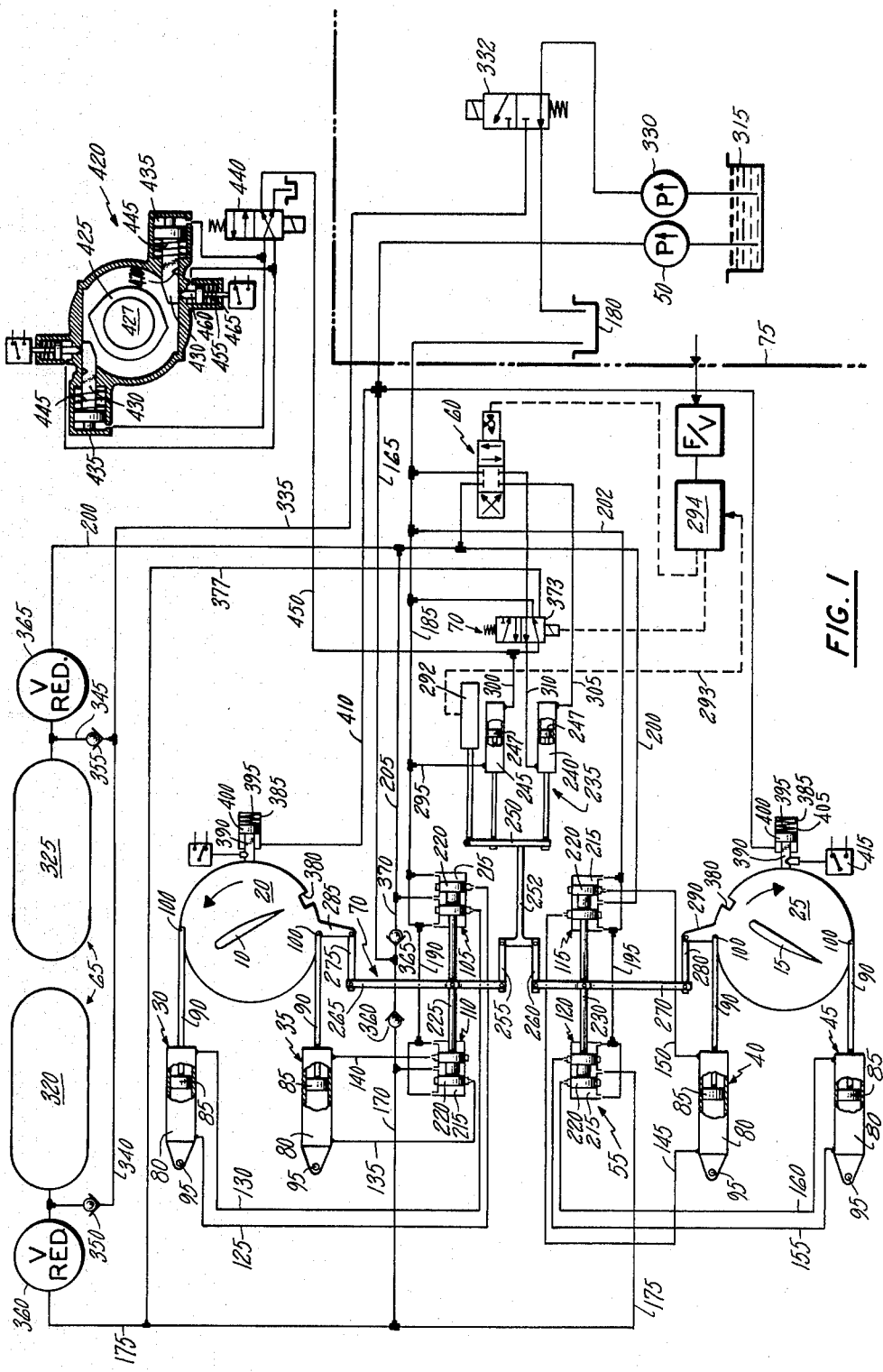
FIG. 1 is a schematic representation of a preferred embodiment of the wind turbine blade pitch control system of the present invention and FIG. 2 is a schematic representation of an alternate preferred embodiment of the blade pitch control system of the present invention.

Referring to FIG. 1, the control system of the present invention is shown in conjunction with a pair of variable pitch wind turbine blades 10 and 15 extending outwardly from base members 20 and 25. While the control system of the present invention is illustrated in conjunction with a pair of wind turbine blades, it will be understood that this system may be employed with equal utility with any number of blades. Blade 10 is pivoted in a counterclockwise direction about its longitudinal axis while blade 15 is pivoted about its longitudinal axis in a clockwise direction for increasing the pitch and feathering the blades (as indicated by the arrows on bases 20 and 25). This rotation of blades 10 and 15 is effected by a plurality of hydraulic actuators 30 through 45, actuators 30 and 35 driving blade 10 and actuators 40 and 45 driving blade 15. The actuators are provided with pressurized hydraulic fluid from first source 50 thereof through distribution means 55, the flow of hydraulic fluid from first source 50 being controlled by first control means 60. Should the demand for hydraulic fluid by actuators 30 through 45 exceed the supply potential of source 50, as where blade pitch changes of large magnitude or feathering is required, further hydraulic fluid is supplied through distributing means 55 from redundant second hydraulic fluid sources 65. The control of the fluid supply from sources 65 is exercised by second control means 70. To minimize weight associated with the mechanical connections between actuators 30 through 45 and the blades, the actuators are preferably mounted on the rotating blade hub (not shown) in, for example, the manner shown and described in U. S. patent application Ser. No. 130,659, entitled "Wind Turbine Blade Pitch Adjustment System", and filed Mar. 17, 1980, in the names of Joseph P. Harry and Edward H. Kusiak and assigned to the assignee of the present invention. To minimize the interfacing of stationary and rotational fluid conduits, the entire control system of the present invention with the exception of first source 50 is disposed on the rotating hub. Source 50 is preferably disposed in the stationary wind turbine nacelle (not shown) or other stationary structure, communication between the first source and the remainder of the control system being across a rotational-stationary interface 75.

Referring to actuators 30 through 45, each of these actuators comprises a double-acting cylinder 80 enclosing a reciprocal piston 85 connected to the base of an associated blade by a connecting rod 90. The cylinders are pressurized and drained in the usual manner causing the desired movement of the pistons. The cylinders are pivotally mounted at ends 95 thereof to the hub, the connecting rods being pivotally mounted to the associated blade base at 100 whereby pressurization of a cylinder on one side of the piston and a draining of the cylinder on the other side of the piston causes rectilinear movement of the piston and a pivoting of the associated blade about its longitudinal axis. The cylinders are pressurized and drained through lines disposed in fluid communication with distribution means 55, which comprises spool valves 105 through 120. Therefore it will be seen that actuator 30 is pressurized and drained through lines 125 and 130 communicating with valve 105; actuator 35 is pressurized and drained through lines 135 and 140 communicating with valve 110; actuator 40 is pressurized and drained through lines 145 and 150 communicating with valve 115 and actuator 45 is pressurized and drained through lines 155 and 160 communicating with valve 120. Valves 110 and 120 communicate with first source 50 through main supply line 165, line 370, and lines 170 and 175; with second source 320 through lines 170 and 175 and connect to drain 180 through main drain line 185 and branch drain lines 190, 195 and 202. Similarly, valves 105 and 115 are connected to source 50 through lines 165, 370, 205 and 200, to redundant second source 325 through lines 200 and 205 to the drain through main drain line 185 and branch drain line 202.

As shown, each of the dispensing valves comprises a valve housing 215 having ports therein which connect with the fluid supply and drain lines set forth immediately hereinabove. These valves are also provided with spool type valve elements 220 each selectively positionable within the corresponding valve housing, and providing communication between the various hydraulic fluid supply and drain lines and a corresponding one of the hydraulic actuators set forth hereinabove. Thus, by way of example, it will be seen that when elements 220 of dispensing valves 110 and 120 are moved to the extreme left within the corresponding valve housings, supply lines 170 and 175 are placed in communication with lines 135 and 160 where hydraulic actuators 35 and 45 are pressurized at the "high pitch sides thereof" so as to move the associated pistons in directions which rotate blades 20 and 25 in increasing pitch directions. Such piston movement will drain hydraulic fluid from the "low pitch sides" of actuators 35 and 45 through lines 140 and 155 which, through the housings of valves 110 and 120, communicate with drain through lines 190 and 185 and lines 195, 202 and 185 respectively.

It will be understood that actuators 30 and 40 are similarly pressurized and drained, such pressurization and draining being controlled by distribution valves 105 and 115. As shown, the elements of valves 110 and 120 are mechanically connected to the elements of valves 105 and 115, by way of connecting rods 225 and 230, respectively. Therefore, it will be seen that when the elements of valves 110 and 120 are moved to the left as described in the example immediately hereinabove, the elements of valves 105 and 115 are also moved to the left thereby allowing the pressurization and drain of actuators 30 and 40 in a manner complimentary to that of actuators 35 and 45. Thus, when valve elements 220 of distribution valves 105 and 115 are moved to the left, supply lines 200 and 205 are placed in communication through the distribution valve housings with lines 130 and 145 whereby the high pitch side of actuators 30 and 40 are pressurized through lines 130 and 145, pivoting the blades in an increasing pitch direction. The low pitch sides of actuators 30 and 40 are drained through lines 125 and 150 which, through distribution valves 105 and 115, are connected to drain lines 185 and 202 to drain 180.

Movement to the right of the distribution valve elements will, of course, connect the low pitch sides of the actuators with first and second sources 50 and 65 of pressurized hydraulic fluid, draining the high pitch sides of the actuators for movement of the blades in a decreasing pitch direction.

The distribution valves are powered by a servo means 235 which comprise a pair of hydraulic servo actuators 240 and 245 the movable pistons 247 thereof being mechanically connected by tie bar 250 which is in turn pivotally connected to links 255 and 260 by shaft 252. Links 255 and 260 are pivotally connected to levers 265 and 270. The ends of levers 265 and 270 opposite those connected to links 255 and 260 are pivotally connected to links 275 and 280, these links being pivotally connected to blade bases 20 and 25 at clevises 285 and 290 respectively. It will be seen that levers 265 and 270 both effect application of an input signal to the distribution valve elements and provide a mechanical feedback signal to those valve elements from the blades themselves. Thus, in the above example wherein the distribution valve elements were moved to the left of the associated housings, levers 265 and 270 are initially pivoted in clockwise and counterclockwise directions about their connections to links 275 and 280 respectively. The resulting movement of the blades in an increasing pitch direction, pivots the control levers about their connections with links 255 and 260, moving the valve elements to the right, thereby returning the dispensing valve elements to their nulled (central) position when the blades reach the desired pitch position. For synchronization of blade movement, the nulling of the distribution valves may be adjusted by adjusting the location of connecting rods 225 and 230 of the connections with levers 265 and 270 respectively.

It will be seen then that after a particular increment of blade movement, the distribution valves are nulled, further blade movement requiring resetting of the distribution valves for repressurization of the blade actuators. For determining the actual movement of the blades, servo pistons 247 are connected to a linear variable differential transformer (LVDT) 292, the core of which being rectilinearly movable with pistons 247 thereby causing the output of the transformer to vary according to the total displacement of pistons 247, thus indicating the displacement of the blades. This signal is fed through line 293 to a controller 294 which compares the sensed blade displacement with that required under the prevailing wind conditions and either effects the maintenance of the servo piston position thereby effecting the maintenance of the blade pitch positions or causes the reactivation of the servos and hence the distrbution valves, to effect further blade pitch adjustment followed by repeated nulling of the distribution valves.

Pressurized hydraulic fluid is supplied to and drained from servo actuator 245 through lines 295 and 300 and supplied to and drained from servo actuator 240 through lines 305 and 310. As will become more readily apparent from a further discussion of this embodiment, hydraulic fluid is admitted to and drained from servo actuator 240 in the normal blade pitch adjusting mode of operation while fluid is supplied to and drained from servo actuator 245 in a blade feathering mode of operation as for example where it is desired to shut the turbine down or prevent overspeed operation of the turbine in high wind velocity conditions. Referring further to FIG. 1, lines 305 and 310 are connected to first and second control means 60 and 70 respectively whereby the delivery and drain of hydraulic fluid to that servo actuator is controlled by both these control means. Lines 295 and 300 from servo actuator 245 are connected to drain and second control means 70 respectively whereby it will be seen that the supply of hydraulic fluid to servo actuator 245 is controlled by the second control means.

First source 50 of pressurized hydraulic fluid comprises a slew pump provided with hydraulic fluid from a sump 315 and discharging to the control system through main supply line 165. Since the output of the slew pump is supplemented by redundant second sources 65 of hydraulic fluid, pump 50 may be economically provided as a constant output pressure pump, in the preferred embodiment the output of this pump being generally in the range of 1500 psi.

Redundant secondary sources 65 of hydraulic fluid comprise accumulators 320 and 325 which discharge to the control system through lines 175 and 200 respectively. The accumulators are charged by a charge pump 330 which also draws hydraulic oil from sump 315, the output of the charge pump being selectively channeled to the accumulators when required, through valve 332. To assure sufficient hydraulic fluid pressure for emergency blade feathering, the charge pump discharges at a relatively constant pressure substantially higher than the output pressure of pump 50, in the preferred embodiment the output pressure of charge pump 330 being in the neighborhood of 3,000 psi. The charge pump discharges through line 335 having branches 340 and 345 which connect line 335 to the accumulators 320 and 325 through check valves 350 and 355 respectively.

Accumulators 320 and 325 discharge through pressure reducing valves 360 and 365 respectively and lines 175 and 200 respectively, the pressure reducing valves lowering the output pressure of the accumulators to values compatible with the various hydraulic valves and actuators employed in the remainder of the system. Fluid from accumulator 320 is channeled to dispensing valve 110 through lines 175 and 170 while fluid from that accumulator is channeled to dispensing valve 120 directly through line 175. Likewise, hydraulic fluid from accumulator 325 is channeled to dispensing valve 105 through lines 200 and 205 while hydraulic fluid from that accumulator is channeled to dispensing valve 115 directly through line 200. It will be seen that hydraulic fluid from each accumulator is supplied to dispensing valves associated with blade actuators connected to both blades. Second control means 70 includes isolating or blocking check valves 360 and 365 disposed in line 370 between lines 170 and 205 to prevent any communication between the hydraulic fluid output of accumulators 320 and 325 either directly or indirectly through the dispensing valves or blade actuators. Thus, it will be appreciated that if either accumulator 320 or 325 or the distributing valves and blade actuators associated therewith fail, the remaining accumulator will supply hydraulic fluid to its associated distributing valves and actuators assuring continued blade pitch adjustment and feathering capability.

First control means 60 comprises a first servo control valve operated by electric or fluid signals or the equivalent thereof from a suitable signal apparatus or controller 294. As shown, first control valve 60 is provided with three settings, a first (righthand) setting corresponding to a blade pitch adjustment in an increasing pitch direction, a second (lefthand) setting corresponding to blade pitch adjustment in a decreasing pitch direction, and a third (central) or null setting. The second control means is responsive to electrical, fluid or similar servo signals provided from the controller and, with valves 360 and 365, comprises a second control valve 373. Control valve 373 is illustrated in a first setting thereof corresponding to normal blade pitch adjustment, a second (upper) setting corresponding to a blade feathering mode.

In operation, if it is desired to increase the blade pitch, control valve 60 is set by the controller to the first (righthand) setting wherein hydraulic fluid from pump 50 and accumulator 325 is valved from lines 165, 370, 205 and 200 to input line 305 of servo 240. Line 310 from servo 240 is drained through valve 373, and through valve 60 to drain line 185 and drain 180. This causes movement of the servo pistons and the distribution valve spools to the left wherein actuators 30 and 40 are, through distribution valves 105 and 115, pressurized with hydraulic fluid from accumulator 325 through lines 200 and 205 and from pump 50 through lines 165, 370, 200 and 205. Likewise, actuators 35 and 45 are, through distribution valves 110 and 120, pressurized with hydraulic fluid from accumulator 320 through lines 175 and 170 and from pump 50 through lines 165, 370, 170 and 175. Such pressurization, moves the blades in an increasing pitch direction, this movement being fed back to the distribution valves through levers 265 and 270 thereby automatically nulling these valves. A signal indicative of the amount of pitch change is fed by the LVDT to the controller which compares the amount of blade pitch change with that required under the prevailing wind conditions and activates first control valve 60 in such manner as to minimize the error between the blade pitch change effected and that required. Likewise, if a decrease in blade pitch is required, first control valve 60 is set to the second (lefthand) position wherein hydraulic fluid from pump 50 and accumulator 325 is valved to first servo inlet line 310 from lines 165, 370, 205, 200 by first control valve 60 and second control valve 373. Hydraulic fluid is drained from first servo 240 through line 305, control valve 60, and drain line 185 to drain 180. This causes the servo piston and the spools of distribution valves 105 through 120 to move to the right wherein actuators 30 and 40 are provided with hydraulic fluid from accumulator 325 through lines 200 and 205 and from pump 50, through lines 165, 370, 200 and 205. Likewise, actuators 35 and 45 are, by the movement to the left of the distribution valve spools provided with hydraulic fluid from accumulator 320 through lines 175 and 170 and from pump 50 through lines 165, 370, 170 and 175. Such pressurization of these actuators moves the blades in a pitch decreasing direction, this movement being fed back to the distribution valves through levers 265 and 270 thereby automatically nulling these valves. Likewise in the manner described hereinabove, the overall movement of the pistons of servo actuators 240 and 245 is sensed by the LVDT which provides the controller with a signal indicative of such movement. This signal is compared in the controller with the blade pitch setting required, the controller readjusting first control valve 60 to readjust the blade pitch to minimize such error.

In conditions where feathering (full high pitch adjustment) of the blades is required as in conditions of excessive wind velocity or where shutdown of the turbine is desired as, for example, where maintenance of the turbine is required, a feather signal to second control valve 373 is provided by the controller 294. Such a signal actuates valve 373 to its feather (upper) setting wherein hydraulic fluid from accumulator 320 is channeled to servo 245 through lines 175 and 377, second control valve 373, and line 300. Likewise hydraulic fluid from pump 50 is channeled to servo 245 through lines 165, 170, 175 and 377, control valve 373 and line 300. This fluid input to servo 245 moves the servo piston to the left, draining the left side of the servo through lines 295 and 185 and moving the distribution valve spools to the left wherein the blades are adjusted to maximum pitch in the manner described hereinabove.

It will also be seen that such actuation of second control valve 373 in a feathering mode of operation disconnects line 310 from first control valve 60, and connects that line to drain through main drain line 185. Thus, a malfunction of first control valve 60, which would otherwise pressurize the left end of servo 245 in a decreasing pitch direction will not inhibit the normal feathering operation of servo means 235.

It will therefore be seen that the blades are hydraulically powered independently of one another whereby no mechanical connections of the blades other than that of the feedback linkage is required. Therefore, the weight of the wind turbine hub and blade assembly is minimized for optimization of the overall efficiency of the turbine. Moreover, it will be seen that the blade pitch control system disclosed herein employs fluid amplification thereby minimizing the weight of the fluid handling components of the control system. That is, unlike various prior art pitch change control mechanisms wherein the entire hydraulic fluid flow is channeled through a control valve to a distributing valve, in the control system of the present invention only a portion of the hydraulic fluid is channeled through the first control valve, the main flow of hydraulic fluid being channeled directly from the accumulator and pump sources thereof to the distribution valves and actuators. Accordingly, the first control valve employed herein may be of lighter weight and lower capacity than prior art control valves, thus enhancing the compactness and weight efficiency of the turbine.

As is readily apparent from the description of the operation of the control system of the present invention, this system exhibits exemplary safety characteristics heretofore unknown in both wind turbine and propeller blade pitch control systems. As set forth above, the hydraulic fluid output of each of the accumulators is both isolated from the output of the other accumulator and isolated from both the hydraulic actuators and distribution valves associated with the other accumulator. Moreover, it will be noted that each of the accumulators supplies hydraulic fluid to actuators associated with each of the wind turbine blades. Accordingly, should either of the accumulators fail to supply hydraulic fluid due to a malfunction of any type, the remaining accumulator supplies hydraulic fluid to actuators associated with all the blades without communication with the malfunctioning accumulator or the fluid lines and distributing valves associated therewith. Therefore, under such malfunction conditions, blade pitch adjustment and emergency feather capabilities are not jeopardized. Likewise, should an actuator associated with one of the blades fail, causing leakage of hydraulic fluid therefrom, the other actuator associated with that blade will still be supplied with hydraulic fluid from an accumulator independent of that associated with the failed actuator thereby preserving the blade pitch adjustment and blade feathering capabilities of the system.

Referring still to FIG. 1, the control system of the present invention is provided with means to positively latch the blades in a feathered position wherein any hydraulic failure of the system subsequent to blade feathering will not jeopardize the maintenance of such feathering. Each of the blade bases 20 and 25 is provided with a notch 380 in the periphery thereof. A feather latch 385 is disposed proximate to the blade base periphery and includes a detent 390 biased toward the blade base by spring 395. The spring is disposed between a piston 400 fixed to an interior end of the detent and an outer end of the latch, the inner latch end being pressurized by hydraulic fluid from main pump 50 through line 410. Loss of hydraulic fluid pressure in this line causes normally compressed spring 395 to urge the detent toward the adjacent blade base and into engagement with notch 380. The latching means also includes an electric switch 415, mechanically actuated by motion of detent 390 to indicate engagement and disengagement of the feather latch 385 to, for example, controller 294.

The control system of the present invention also includes a teeter lock 420 which locks the plane defined by the wind turbine blade tips in an angular orientation offset from vertical. Such locking is required in high wind velocity conditions to prevent impact of the blades with the tower or other wind turbine supporting structure (not shown) due to the inherent flexibility of the blades. The teeter lock mechanism comprises a blade mount journal 425 on which the wind turbine blade supporting hub is mounted. Journal 425 rotates about a generally horizontal axis 427 and may be pivotally adjustable by any suitable mechanism (not shown) for optimization of wind capture by the turbine blade. As shown, journal 425 is engageable with keeprs 430 which, when engaged with the journal, lock the journal in the hereinabove described angular orientation. The keepers 430 form the piston rods of hydraulic actuators 435 in fluid communication with teeter lock control valve 440. As shown, under normal operating conditions, the keepers are biased away from journal 425 by normally compressed springs 445 and actuators 435 are maintained in fluid communication with drain through control valve 440. However, under feather conditions, valve 440 is actuated by, for example, controller 294 to the upper valve position connecting actuators 435 with second control valve 70 through line 450. The second control valve, having been actuated by a feather signal thereto connects line 450 with line 377 such that actuators 435 are pressurized, urging keepers 430 into engagement with the journal. The teeter locking means may also include hydraulically or electrically controlled latches 455 having a latching element 460 which is normally urged away from keeper 430 by hydraulic fluid supplied to the latch through line 450 and acting on the latch piston. During feathering, valve 440 connects latch 455 to drain wherein spring 465 urges keeper 460 into engagement with a detent notch on keeper 430 thereby mechanically locking the keeper in engagement with the journal for maintenance of the offset angular orientation of the blades with the wind turbine tower.

Figure 2:
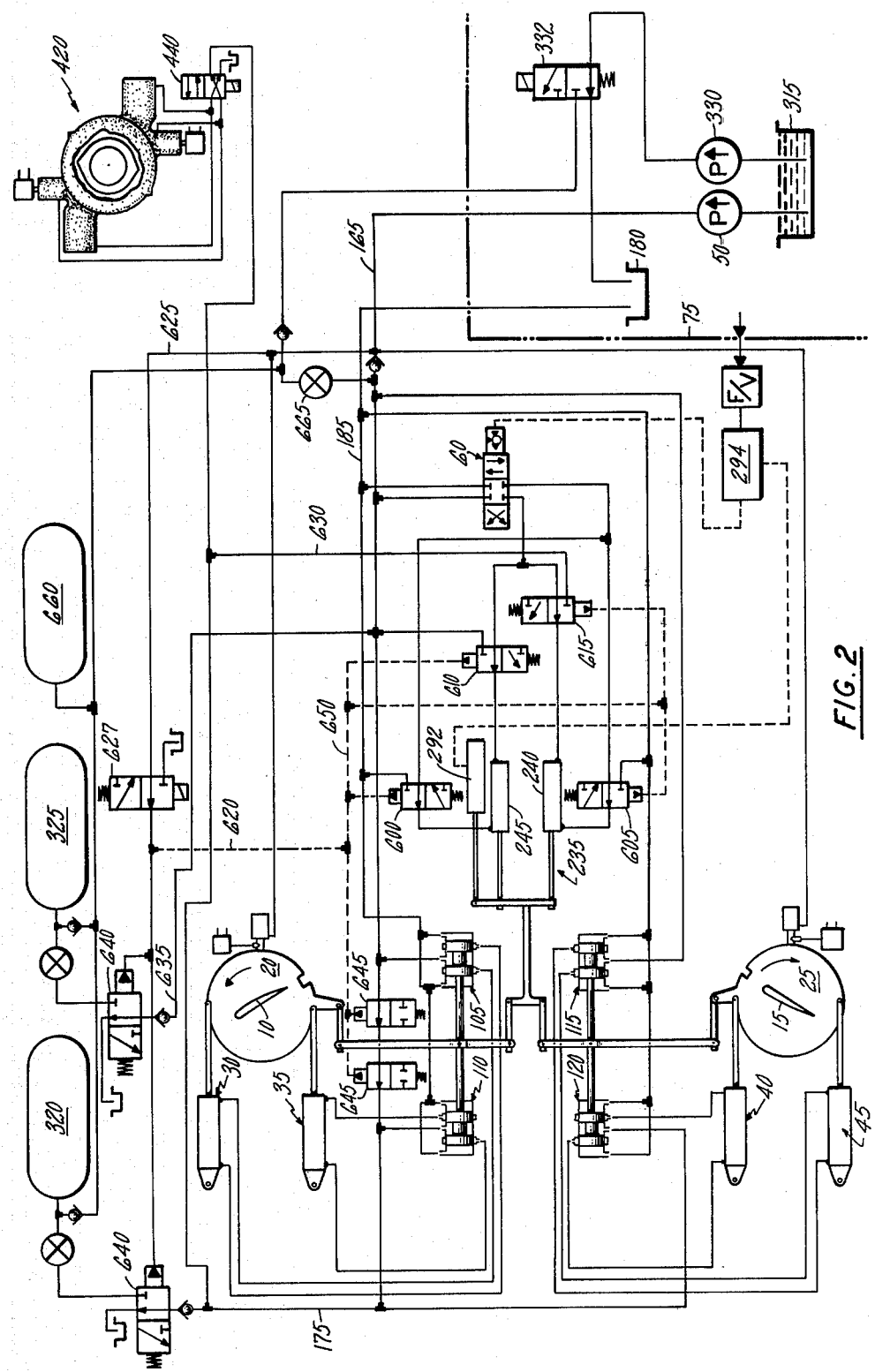

Referring to FIG. 2, an alternate embodiment of the wind turbine blade pitch control system of the present invention is shown, components of this embodiment which correspond to similar components in the previously described embodiment being indicated by the same reference characters. It will be seen that similar to the system shown in FIG. 1, the system of FIG. 2 includes wind turbine blades 10 and 15 driven in rotation about the longitudinal axes thereof by actuators 30 through 45 which receive pressurized hydraulic fluid from the first source thereof or slew pump 50 in response to the setting of a first servo operated control valve 60. As described with respect to the embodiment illustrated in FIG. 1, the fluid is delivered to the actuators through distribution valves 105 through 120 actuated by the pair of servo actuators 240 and 245, the distribution valves being nulled by a mechanical feedback system by which the distribution valve elements, blades, and servo actuators are interconnected.

Generally, this alternate embodiment differs from the embodiment of FIG. 1 in the construction of the second control means and the connections of the accumulators or redundant second hydraulic sources to these second control means. As shown in FIG. 2, rather than a second servo operated control valve or feather valve 373, the control system of FIG. 2 employs four individual feather control valves 600 through 615 shown set for normal blade pitch adjustment. As illustrated, valves 600 and 605 provide communication between first control valve 60 and the left ends of the servo actuator cylinders. In like manner, feather control valves 610 and 615 provide communication between first control valve 60 and the right sides of the servo actuator cylinders. Thus, it will be seen that under normal blade pitch adjusting conditions, the feather control valves set as shown in the drawing provide conduits for the normal supply and drain of hydraulic fluid as controlled by valve 60. Valves 600-615 are controlled by pilot fluid pressure applied to the valves through lines 620 and 625 which are connected to main supply line 165 and slew pump 50. Loss of this pilot fluid pressure is occasioned by, for example, failure of the main hydraulic fluid supply or a reduced pilot pressure signal from actuation by the system controller (not shown) of feather solenoid valve 627 from its normal (illustrated) setting to its feather setting wherein line 625 is connected to drain. The feather control valves 600–615 are spring biased to their feather settings wherein such loss of pilot fluid pressure causes the valves to connect the left ends of servo actuators 240 and 245 directly to drain line 185. The loss of pilot pressure causing the actuation of valves 610 and 615 to assume the feather positions thereof, effects the connection of the right side of servo actuators 240 and 245 with redundant second fluid sources or accumulators 320 and 325 respectively through lines 630 and 635 respectively. Thus, it is seen that valves 600 through 615 take over for control valve 60 under feather conditions, controlling the supply and drain of hydraulic fluid from the accumulators. It will also be seen that the accumulators provide hydraulic fluid only under feather conditions, and not for normal pitch change operation as did the accumulators of the system illustrated in FIG. 1. Accordingly, the output of each accumulator is controlled by an accumulator output valve 640 which is held in the normal (illustrated) setting by pilot fluid pressure in line 625. Loss of this pilot fluid pressure by actuation of valve 627 causes the biasing of the valve to the right by an associated valve spring thereby connecting the output of the accumulators with the associated feather control valve 610 or 615.

The outputs of the accumulators are isolated from each other by means of servo operated isolating valves 645 disposed in main supply line 165. Under normal operating conditions, the isolating valves are set as illustrated whereby hydraulic fluid from line 165 is provided to the distribution valves 105–120 through valves 645. However, under feather conditions a loss of pilot fluid pressure in line 650 which communicates with line 620 causes the isolating valves to be biased into the feather settings thereof wherein the output of accumulator 320, fed to the distributing valves through line 175, is isolated from the output of accumulator 325 fed to the distributing means through line 635 and main supply line 165.

The control system of the present invention may also be provided with a third or pitch change accumulator 660 the output of which is connected to main supply line 165 through a pressure reducing valve 665. Accumulator 660 provides additional hydraulic fluid to the system for blade pitch changes of high magnitude, when the output of slew pump 50 is inadequate. Like accumulators 320 and 325, accumulator 660 is charged by charge pump 330.

It will be seen therefore, that this second embodiment of the control system of the present invention exhibits many of the same advantages as those associated with the system described in reference to FIG. 1. That is, hydraulic fluid, supplied to the distributing valves under feather conditions is supplied from redundant isolated sources thereof, each source feeding actuators powering both the blades while the outputs of the redundant sources remain isolated thereby preventing for example, the loss of hydraulic fluid from one of the sources through a leak or rupture of the other source or a line associated therewith. Furthermore, the control system of the embodiment shown in FIG. 2 as that shown in FIG. 1, has associated therewith fluid amplification from the first control valve to the distributing means whereby the first control valve is required to handle only a small portion of the flow. Therefore, this control valve will exhibit enhanced lightness and compactness allowing the valve to be conveniently mounted on the wind turbine hub without unacceptable sacrifice in turbine performance.

While there have been described alternate preferred embodiments of the control system of the present invention, it will be understood that modifications may suggest themselves to those skilled in the art and it is intended by the appended claims to cover such modifications as fall within the true spirit of this invention.

We claim:

1. A pitch control system for a wind turbine having a plurality of blades, said control system comprising a plurality of hydraulic actuators, each connected to one of said blades and adapted to pivot said blade about the longitudinal axis thereof in blade pitch adjusting and feathering modes of operation; means in fluid communication with said actuators for selectively distributing hydraulic fluid to said actuators in both pitch adjusting and feathering modes of operation; first and redundant second sources of pressurized hydraulic fluid in fluid communication with said distributing means for supplying hydraulic fluid thereto for delivery to said actuators; first means communicating with said first hydraulic fluid source for controlling the introduction of hydraulic fluid from said first source to said distributing means in said blade pitch adjusting mode and second means communicating with said second hydraulic fluid sources for controlling the introduction of hydraulic fluid from said redundant second hydraulic fluid sources in said blade feathering mode such that each of said redundant sources supplies hydraulic fluid to at least a single one of said actuators associated with each of said blades independently of other hydraulic actuators associated therewith whereby each of said redundant second sources of hydraulic fluid is individually capable of powering all of said blades simultaneously in said feather mode of operation.

2. Blade pitch control system according to claim 1 wherein said means for controlling the introduction of hydraulic fluid from said redundant second hydraulic fluid sources includes means for preventing fluid communication between said redundant second hydraulic fluid sources for supplying hydraulic fluid to at least said single one of said actuators associated with each of said blades independently of the remainder of said redundant sources.

3. Wind turbine blade pitch control system according to claim 1 wherein said distributing means comprises a servo means communicating with said first control means and a valve means communicating with said first hydraulic fluid source and powered by said servo means, and wherein said distributing means and said first control means comprise a fluid amplifier, said first control means controlling admittance of hydraulic fluid from said first source to said servo means, said servo means in response to said hydraulic fluid admitted thereto, actuating said distributing valve means for selected valving of hydraulic fluid directly from said first source thereof to said actuators.

4. Wind turbine blade pitch control system according to claim 3 wherein said second control means and said distributing means comprise a fluid amplifier, said second control means controlling admittance of hydraulic fluid from said first and second sources thereof to said servo means.

5. Wind turbine blade pitch control system according to claim 4 wherein said distributing valve means comprises a distributing valve associated with each of said blade actuators, each of said distributing valves comprising a housing including ports in fluid communication with a corresponding one of said actuators, said first and one of said second hydraulic fluid sources and drain, and further comprising a movable valve element disposed in said housing for selected interconnection of said ports, said valve element being operatively connected to said blades in mechanical feedback relation thereto such that said valving means is nulled by movement of said valve element effected by pivotal movement of said blade in response to the operation of said actuator by the admittance of pressurized hydraulic fluid thereto.

6. Wind turbine blade pitch control system according to claim 5 wherein said servo means comprises an hydraulic motor having a reciprocal piston therein, said piston being operatively connected to said valve element for movement therewith.

7. Wind turbine blade pitch control system according to claim 6 wherein said servo means and said blades are connected to said distributing valve element by way of pivotal connections to a control linkage at first and second spaced locations thereon, said valve element being pivotally connected to said linkage at a location thereon between said first and second locations.

8. Wind turbine blade pitch control system according to claim 7 wherein said control linkage comprises a single lever.

9. Wind turbine blade pitch control system according to claim 3 wherein each of said blades is pivotally driven by at least a pair of hydraulic actuators, each of said pair of blade actuators communicating with a corresponding distributing valve means, said second control means including isolating valve means, disposed in a hydraulic line connecting fluid inlets of the distribution valve means associated with said pair of actuators, said isolating valve means blocking communication between said distributing valve inlets during feathering of said blades thereby preventing communication between said redundant hydraulic fluid sources individually supplying hydraulic fluid to said pair of valving means.

10. Wind turbine blade pitch control system according to claim 9 wherein the inlet of the distribution valve means associated with one of said pair of actuators communicates with the inlet of said distributing valve means associated with at least one of the actuators associated with each of the remainder of said blades.

11. Wind turbine blade pitch control system according to claim 3 wherein said second control means comprises a first feather control valve adapted to provide fluid communication between said servo means and drain and a second feather control valve adapted to provide fluid communication between said servo means and one of said redundant second hydraulic fluid sources in said feathering mode.

12. Wind turbine blade pitch control system according to claim 11 wherein said first and second feather control valves are disposed in fluid communication with said first control means as well as said servo means for providing communication between said servo means and said first control means in said blade pitch adjusting mode of operation.

13. Wind turbine blade pitch control system according to claim 3 wherein said first control means comprises a first servo operating control valve having a first setting wherein hydraulic fluid from said first source is valved to and drained from said servo means in such manner as to effect an increase in blade pitch and a second setting wherein hydraulic fluid from said first source is valved to and drained from said servo means in such manner as to effect a decrease in blade pitch.

14. Wind turbine blade pitch control system according to claim 13 wherein said servo means comprise a pair of hydraulic servo actuators operatively connected to said distributing valve means in driving engagement therewith, hydraulic fluid delivery to a first of said servo actuators being controlled by both said first and second control means, said first servo actuator being adapted to power said distributing valve means in said blade pitch adjusting mode, hydraulic fluid delivery to a second of said servo actuators being controlled by said second control means and adapted to power said distributing valve means in said blade feathering mode.

15. Wind turbine blade pitch control system according to claim 14 wherein said second control means comprises a second servo operated control valve having a first setting for normal blade pitch adjustment wherein said first servo actuator is disposed in fluid communication with first hydraulic fluid source and drain connections on said first control means and said second servo actuator is disposed in fluid communication with drain, said second servo operated control valve having a second setting for blade feathering wherein said first servo actuator is disposed in fluid communication with drain and said second servo actuator is disposed in fluid communication with one of said redundant second sources of pressurized hydraulic fluid, said first source of pressurized hydraulic fluid and drain.

16. Wind turbine blade pitch control system according to claim 15 wherein said one redundant second hydraulic fluid source communicates with said first hydraulic fluid source for supplementing the supply of hydraulic fluid to said servo means and said blade actuators under conditions of normal pitch change adjustment.

17. Wind turbine blade pitch control system according to claim 1 and further including hydraulically controlled blade latching means, loss of hydraulic fluid pressure to said latching means causing a latch element to engage an associated blade such that said blade is pivotally restrained in a feathered position.

18. Wind turbine blade pitch control system according to claim 1 and further including hydraulically controlled teeter locking means actuated during blade feathering to lock said blades in an angular orientation such that a plane defined by the paths of said blade tips is offset from vertical thereby minimizing the risk of impact of said blades with any wind turbine supporting structure in high wind velocity conditions.

19. Wind turbine blade pitch control system according to claim 18, said teeter locking means including a blade mount journal, a journal keeper engageable with said journal to prevent rotation thereof, said keeper being hydraulically actuated by fluid at least in part from one of said redundant sources thereof and including a teeter lock control valve controlling the flow of hydraulic fluid from said one redundant source for actuation of said keeper, said teeter locking means further including a servo controlled latching element engageable with said keeper for restraint of said keeper in a position of engagement with said journal.

* * * * *